United States Patent [19]

Ueda et al.

[11] Patent Number: 5,128,961
[45] Date of Patent: Jul. 7, 1992

[54] DISTANCE MEASUREMENT METHOD AND APPARATUS, AND RELATIVE POSITION MEASUREMENT APPARATUS

[75] Inventors: Tomoaki Ueda, Kyoto; Koei Obata, Kusatsu, both of Japan

[73] Assignee: Daikin Industries, Ltd., Osaka, Japan

[21] Appl. No.: 617,769

[22] Filed: Nov. 26, 1990

[30] Foreign Application Priority Data

Nov. 24, 1989 [JP] Japan .................................. 1-306142

[51] Int. Cl.[5] .............................................. H04L 9/00
[52] U.S. Cl. ....................................... 375/1; 342/458; 380/48; 364/717
[58] Field of Search ................... 375/1; 342/458, 378; 380/48, 34; 364/717

[56] References Cited

U.S. PATENT DOCUMENTS

| | | | |
|---|---|---|---|
| 4,041,391 | 8/1977 | Deerkoski | 375/1 |
| 4,206,462 | 6/1980 | Rabow et al. | 380/48 |
| 4,926,440 | 5/1990 | Mikoshiba et al. | 375/1 |
| 4,943,975 | 7/1990 | Kurihara et al. | 375/1 |
| 5,031,130 | 7/1991 | Harada | 364/717 |
| 5,036,330 | 7/1991 | Imae et al. | 375/1 |

Primary Examiner—Thomas H. Tarcza
Assistant Examiner—David Cain
Attorney, Agent, or Firm—Beveridge, DeGrandi & Weilacher

[57] ABSTRACT

A distance measurement apparatus receives pseudo noise reflected from a target object. The apparatus then obtains a cross-correlation value from cross-correlation of the received pseudo noise with pseudo noise which has been convoluted with expected measurement values. The apparatus measures a distance to the target object based upon the cross-correlation value. Also, a relative position measurement apparatus measures distances to an operator from plural points on the apparatus and then measures a relative position of the operator with respect to the apparatus based upon the plural distances.

9 Claims, 10 Drawing Sheets

DISTANCE MEASUREMENT METHOD AND APPARATUS, AND RELATIVE POSITION MEASUREMENT APPARATUS

BACKGROUND OF THE INVENTION

This present invention relates to a distance measurement method and apparatus and a relative position measurement apparatus, and more particularly, to a method and apparatus for measuring distance to a target object using pseudo noises which are represented by maximal sequence codes, and to an apparatus for measuring relative position of an operator with respect to a device.

It is known that distance to a target object can be measured using maximal-sequence codes which are a variety of pseudo noises.

FIG. 11 is a block diagram schematically showing an arrangement of a conventional distance measurement apparatus. A carrier signal which is output from a carrier signal generator is supplied to a balanced modulator, and a maximal-sequence code which is output from a maximal-sequence code generator is also supplied to the balanced modulator to modulate the carrier signal with the maximal-sequence code. The modulated carrier signal is radiated to a target object by a transducer. The modulated carrier signal is reflected by the target object and received by a receiver. The received signal is supplied to a balanced mixer to which a maximal-sequence code is supplied through a variable delay unit, to obtain an inpulse response. An inpulse response signal is supplied to a distance counter through a synchronous detector. The maximal-sequence code output from the variable delay unit is also supplied to the distance counter and the maximal-sequence code is directly supplied to the distance counter so as to measure the distance to the target object.

That is, a cross-correlation of a reflected maximal-sequence code which is obtained by radiating a standard maximal-sequence code and reflecting of the code by the target object with maximal-sequence codes which are obtained by shifting the standard maximal-sequence code with every 1 bit, is obtained. Then, a propagation delay time of the maximal-sequence code is obtained based upon a maximal-sequence code with a predetermined number of bits shifted to obtain the maximum cross-correlation value. Thereafter, the distance to the target object is measured based upon the obtained propagation delay time and a known wave propagation delay time.

Furthermore, noise influence is effectively reduced so as to provide remarkably accurate distance measurements without strengthening the radiated maximal-sequence code because the maximal-sequence code has significant auto-correlation characteristics. The maximal-sequence code can easily be lengthened in code length and noise influence can be reduced further as a result of code length lengthening, thereby the desired distance measurement accuracy can be easily obtained. That is, a distance resolution $\Delta l$ is expressed by the equation of $\Delta l \leq CT/L$ (meters), and the distance resolution can be lesser by making the L longer. Where, a propagation velocity is C m/sec., the code length is L bits and 1 cycle of the maximal-sequence code is T sec.

Cross-correlation values of the reflected maximal-sequence code with a plurality of species of shifted maximal-sequence codes corresponding to the code length are necessarily calculated because the maximum cross-correlation value must be detected. This has the disadvantage of remarkably lengthening the necessary time period for distance measurement. The disadvantage becomes more and more conspicuous with further improvement in distance measurement accuracy.

The disadvantage can be eliminated by providing cross-correlators for obtaining cross-correlation values based upon every shifted maximal-sequence code corresponding to the code length. The further disadvantage of enlargement of the distance measurement apparatus is arisen because the number of cross-correlators is remarkably increased.

In both distance measurement apparatus, when the apparatus are used under circumstances of multipath reflection, maximum cross-correlation values are detected for every reflection path. This is disadvantageous because measuring the distance to the target object with accuracy becomes very difficult.

Conventionally in a three-dimensional graphics display apparatus, stereoscopic vision is employed so as to give a feeling of realness to display figures. But sufficient realness may not be obtained by employing only stereoscopic vision. Consequently, it is demanded that a perspective projection of the display figure with respect to the viewing direction be obtained based upon the detected relative positions of the operator and the display.

To satisfy the demand, a method may be employed in which distance measurements based upon a pulse echo method using ultrasonic waves are performed at different positions in a three-dimensional graphics display apparatus. Then, the relative position of the operator is measured based upon the plural distance measurement results. When distance measurement based on the pulse echo method using ultrasonic waves is performed, disadvantages arise in that malfunctions caused by noise output from office automation apparatus may occur, in that malfunctions of sound input interfaces may occur, and in that malfunctions caused by multipath reflection and the like may occur because the effective range of distance measurement cannot be limited to a neighbouring graphics display apparatus and that interference with another interface employed in the same manner cannot be avoided. As a result, measuring the accurate relative position of the operator with respect to the graphics display apparatus becomes almost impossible.

To eliminate these disadvantages, a method may be employed in which a carrier signal is modulated with pseudo noise and radiated, then a received signal is demodulated in the graphics display apparatus. But another disadvantage arises in that the time period necessary for distance measurement is lengthened by calculation of cross-correlation values for the received signal with every shifted maximal-sequence code corresponding to the code length, because the maximum cross-correlation value must be detected in the receiving side. The disadvantage becomes more and more conspicuous with the improvement of accuracy of the distance measurement. Display speed of the graphics display apparatus is remarkably lowered, accordingly.

The disadvantage can be eliminated by providing cross-correlators for obtaining cross-correlation values based upon every shifted maximal-sequence code corresponding to the code length. The further disadvantage of enlargement of the distance measurement apparatus arises because the number of cross-correlators is remarkably increased.

In both distance measurement apparatus, when the apparatus are used under a circumstance with multipath reflection, maximum cross-correlation values are detcted for every reflection path, thereby the disadvantage arises that measuring the distance to the target object with accuracy becomes very difficult.

As a result, in a three-dimensional graphics display apparatus, it is not performed at all that a relative position (viewing direction to a scope and the like) of an operator is automatically measured, a viewing direction is calculated based upon the measurement result and then a perspective projection and the like of display figures is changed in correspondence with the viewing direction.

In apparatus, which are preferably controlled based upon a detected relative position of an operator with other than the graphics display apparatus, similar disadvantages as mentioned above, arise.

SUMMARY OF THE INVENTION

It is an object of the present invention to measure a distance to a target object with a remarkable short time period and without complicating an arrangement of a distance measurement apparatus.

It is another object of the present invention to easily eliminate the influence of multipath reflection.

It is a further object of the present invention to accurately measure a relative position of an operator with respect to an apparatus with a remarkably short time period and without complicating an arrangement of a relative position measurement apparatus.

A distance measurement method according to the present invention comprises the steps of:

radiating pseudo noise which has significant auto-correlation characteristics to a target object;

receiving pseudo noise which is reflected from the target object;

obtaining a cross-correlation value by cross-correlating the received pseudo noise with convolution noise which is obtained by convoluting coefficients that are different from one another with the pseudo noise; and measuring a distance based upon the obtained cross-correlation value.

When this distance measurement method is employed, the maximum cross-correlation value is obtained based on pseudo noise shifted with a predetermined shifting quantity corresponding to the propagated distance. And the coefficient, or the predetermined shifting quantity of the corresponding pseudo noise, is obtained based upon the obtained cross-correlation value because every shifted pseudo noise is previously convoluted with predetermined coefficients. Then, the distance to the target object is measured based upon the obtained shifting quantity.

It is preferable that the pseudo noise is a maximal-sequence code and the convolution noise is obtained by convoluting expected values as coefficients with the pseudo noise.

When this distance measurement method is employed, the pseudo noise can easily be generated, and the distance to the target object can easily be measured with a short time period based upon the generated pseudo noise.

It is further preferable that the expected values have monotonously varying values other than 0 within a permitted measurement range and have 0 value outside this range.

When this distance measurement method is employed, a cross-correlation value other than 0 is obtained when the target object is within the range permitting measurement. On the contrary, the cross-correlation value is 0 when the target object is outside the permitted measurement range. As a result, measurement error caused by multipath reflection and the like is certainly eliminated by determining the optimum range for permitting measurement when distance measurement to the target object is performed under circumstances of multipath reflection.

A distance measurement apparatus according to the present invention comprises:

transmission means for modulating a carrier signal with pseudo noise to obtain a modulated signal and for radiating the modulated signal; and receiving means for receiving a signal reflected from the target object and for obtaining a distance to the target object, wherein the receiving means includes convolution code output means for outputting a convolution code which is obtained by convoluting expected values different from one another with every shifted pseudo noise, the sequence code being the same as that of the transmission means, cross-correlation means for obtaining a cross-correlation value from cross-correlation of the received pseudo noise with the convolution code, and distance calculation means for calculating the distance based upon the cross-correlation value.

When this distance measurement apparatus is employed, it is detected which cross-correlation value with a pseudo noise to which one expected value is convoluted is maximum, based upon the obtained cross-correlation value. Then, the distance to the target object is accurately measured based upon the shifting quantity of the pseudo noise convoluted with the corresponding expected value.

It is preferable that the pseudo noise is a maximal-sequence code and the convolution noise is obtained by convoluting expected values as coefficients with the pseudo noise.

It is further preferable that the expected values have monotonously varying values other than 0 within a permitted measurement range and have 0 value outside the range.

A relative position measurement apparatus according to the present invention comprises:

a pseudo noise radiation source for radiating pseudo noise to an operator of an apparatus;

plural pseudo noise receiving means for obtaining distances to the operator, the receiving means being attached to the apparatus at predetermined positions which are spaced apart from one another; and relative position calculation means for calculating a relative position of the operator based on the distances obtained by the pseudo noise receiving means, wherein the pseudo noise receiving means includes convolution code output means for outputting a convolution code which is obtained by convoluting expected values that are different from one another with every bit of shifted pseudo noise, the sequence code being the same as the radiated pseudo noise, cross-correlation means for obtaining cross-correlation a value of the received pseudo noise cross-correlated with the convolution code, and distance calculation means for calculating the distance based upon the cross-correlation value.

When this relative position measurement apparatus is employed, pseudo noise radiated from the pseudo noise rariation source to the operator is received by the plural pseudo noise receiving means attached at predetermined positions which are apart from one another on the apparatus. In each pseudo noise receiving means, the cross-correlation value is obtained by the cross-correlation means based on the received pseudo noise and the convolution code output from the convolution code output means, then the distance to the target object is obtained by the distance calculation means. More specifically, pseudo noise having significant auto-correlation characteristics is received and the cross-correlation value of the received pseudo noise with the convolution code, then the maximum cross-correlation value is obtained in correspondence with the pseudo noise having a shifting quantity corresponding to the propagated distance. And the coefficient, or the predetermined shifting quantity of the corresponding pseudo noise, is obtained based upon the obtained cross-correlation value because every shifted pseudo noise is previously convoluted with predetermined coefficients. Then, the distance to the target object is measured based upon the obtained shifting quantity. Thereafter, the relative position of the operator with respect to the apparatus is calculated based upon the distances output from all pseudo noise receiving means. The apparatus performs the previously determined processings based upon the calculated relative position.

It is preferable that the pseudo noise radiation source is a maximal-sequence sound source, the apparatus is a three-dimensional graphics display apparatus, and the three-dimensional graphics display apparatus determines a viewing direction based upon the calculated relative position.

When this relative position measurement apparatus is employed, pseudo noise is easily obtained by modulating a sound wave with a maximal-sequence code. And the relative position of the operator is calculated based upon the obtained pseudo noise, a viewing direction is determined based upon the calculation result, then a perspective projection or the like of display figures is changed, in correspondence with the viewing direction.

It is also preferable that the convolution code output means provides a convolution code which is obtained by convoluting expected values having monotonously varying values other than 0 within a permitted measurement range and having 0 value outside the range with the pseudo noise.

When this relative position measurement apparatus is employed, a cross-correlation value other than 0 is obtained when the operator is within the range for permitting measurement and on the contrary, the cross correlation value is 0 when the operator is outside the range for permitting measurement. As a result, measurement error caused by multipath reflection and the like is certainly eliminated so as to provide for accurately measuring the relative position by determining the optimum range for permitting measurement when the relative position measurement of the operator is performed under circumstances of multipath reflection.

It is of course possible that pseudo noises having significant auto-correlation characteristics other than the maximal-sequence code are employed.

More specifically, a maximal-sequence code is the longest code sequence within codes which can be generated by shift registers having a predetermined number of stages or a feedback code generator made of delay devices, and is so called the maximal periodic sequences or the longest sequences. The maximal-sequence code may be in the form of a modulo-j code where j is an arbitrary number; a binary system code is used in the following explanation. The binary system code has the following characteristics:

(1) The difference between the number of appearances of "0" and the number of appearances of "1" within one period of a series is only 1 bit. That is, when a binary system code having a bit length of $2^n-1$ is employed, the number of appearances of "1" is $2^{n-1}$, while the number of appearances of "0" is $2^{n-1}-1$. Concretely, when n=3, the binary system code is "1 0 1 1 1 0 0" for example, and the number of appearances of "1" is greater than that of "0" by 1.

(2) The statistical distribution of "0" and "1" is constant. The relative position of strings of "0" and "1" vary depending on the binary system code, but the number of appearances of a string having a predetermined length is constant for all binary system codes which have the same bit length as one another.

(3) Referring to FIG. 12, the auto-correlation value of the binary system code is $2^n-1$ (which is equal to the bit length) for 0 bit shift, while the auto-correlation value of the binary system code is $-1$ for an arbitrary number of bit shifts other than the bit shift range of $0\pm 1$. The auto-correlation value of $-1$ is obtained by counting the number of coincidence portions, and the value of $-1$ indicates that the number of dissonances is greater than the number of coincidences by 1. Further, the auto-correlation value varies linearly from $-1$ to $2^2-1$ within the bit shift range of $0\pm 1$.

(4) Summation with a modulo-2 of an original binary system code and a phase shifted original binary system code with predetermined phase shifting quantity is another phase shifted original binary system code which phase shifting quantity is different from the predetermined phase shifting quantity.

(5) All inner states which are able to be obtained by an n-steps shift register generator appear in a binary system code at a predetermined clock time within one period. That is, each inner state appears only one time, and within only one clock time.

It is widely known that noise has significant auto-correlation characteristics and the auto-correlation values of noise are negligible when noise is shifted slightly. The maximal-sequence code can be used as a pseudo noise because the maximal-sequence code has a characteristic similar to the characteristic mentioned above, following the lengthening of the bit length.

When the maximal-sequence code is radiated to the target object and is received after being reflected by the target object, the received maximal-sequence code is phase shifted with a predetermined number of bits which corresponds to a propagated distance (twice the distance to the target object) with respect to the original maximal-sequence code. The maximum cross-correlation value is accordingly obtained by obtaining cross-correlation of the received maximal-sequence code with the phase shifted maximal-sequence code by the predetermined number of bits.

Conventionally, cross-correlation values are calculated based upon plural maximal-sequence codes which are sequentially phase shifted by 1 bit, then the bit shifting quantity enables obtaining the maximum cross-correlation value. Thereby, the conventional distance measurement apparatus is provided plural cross-correlation value calculation circuits in correspondence with each phase shifted maximal-sequence code or is arranged to sequentially perform cross-correlation value calculation processings for every phase shifted maximal-sequence code.

The inventor advanced the researches for pseudo noises represented by maximal-sequence codes and found new characteristics as follows:

When the code of "0" in maximal-sequence codes is replaced with the code of "−1", cross-correlation of a standard maximal-sequence code with a serial code which is obtained by adding plural maximal-sequence codes, each maximal-sequence code being obtained by phase shifting the standard maximal-sequence code with individual phase, is the same as a sum of cross-correlations of the standard maximal-sequence code with individual maximal-sequence code.

The inventor worked out this present invention based on the findings.

When a standard maximal-sequence code "1 0 1 1 1 0 0" having a bit length of $2^3-1$, shown in FIG. 10-A1, is taken into consideration for example, maximal-sequence codes which are phase shifted with +1 bit, +2 bits and +4 bits are "0 1 0 1 1 1 0", "0 0 1 0 1 1 1" and "1 1 0 0 1 0 1" (refer to FIGS. 10-B1, 10-C1 and 10-D1). A sequence code which is obtained by adding the maximal-sequence codes phase shifted with +1 bit, +2 bits and +4 bits respectively, is shown in FIG. 10-E1. When the reflected maximal-sequence codes are phase shifted with +1 bit, +2 bits and +4 bits respectively and the cross-correlation of the maximal-sequence codes reflected by the target object with the standard maximal-sequence code is obtained, peaks having the same value as the peak of the auto-correlation (refer to FIG. 10-A2) are obtained respectively at the phase shifted position with +1 bit, +2 bits and +4 bits (refer to FIGS. 10-B2, 10-C2 and 10-D2) with respect to the auto-correlation for the maximal-sequence codes which are phase shifted with +1 bits, +2 bits and +4 bits.

Furthermore, the peak values of the cross-correlations shown in FIGS. 10-A2, 10-B2, 10-C2 and 10-D2 are 7, and these peak values of the cross-correlations vary in correspondence with each coefficient of the phase shifted maximal sequence code with corresponding bits by previously convoluting coefficients that are different from one another with the phase shifted maximal-sequence code with +1 bit, +2 bits and +4 bits.

The inventor worked out this present invention based on the findings.

Sequence codes for obtaining cross-correlation of the received maximal-sequence code are maximal-sequence codes which are obtained by phase shifting every 1 bit and by convoluting expected values that are different from one another. Thereby, the cross-correlation value of the received maximal-sequence code with the maximal-sequence code phase shifted with predetermined bits which is the same as of the received maximal-sequence code becomes maximum, and it is detected based upon obtained cross-correlation values that the maximum cross-correlation value is obtained based upon which one of the maximal-sequence codes to which a corresponding expected value for measurement is convoluted because every maximal-sequence code is convoluted corresponding with an expected value for measurement. As a result, it is sufficient to calculate the cross-correlation value only once so as to remarkably shorten the time period necessary for measurement. It is also sufficient to provide only one cross-correlation value calculation circuit so as to remarkably simplify the arrangement of the measurement apparatus.

The above, and other objects, features and advantages of this invention will be apparent from the following detailed description of illustrative embodiments which is to be read with the accompanying drawings.

DETAILED DESCRIPTION OF THE PREFERRED EMBODIMENTS

First Embodiment

Figure 1:
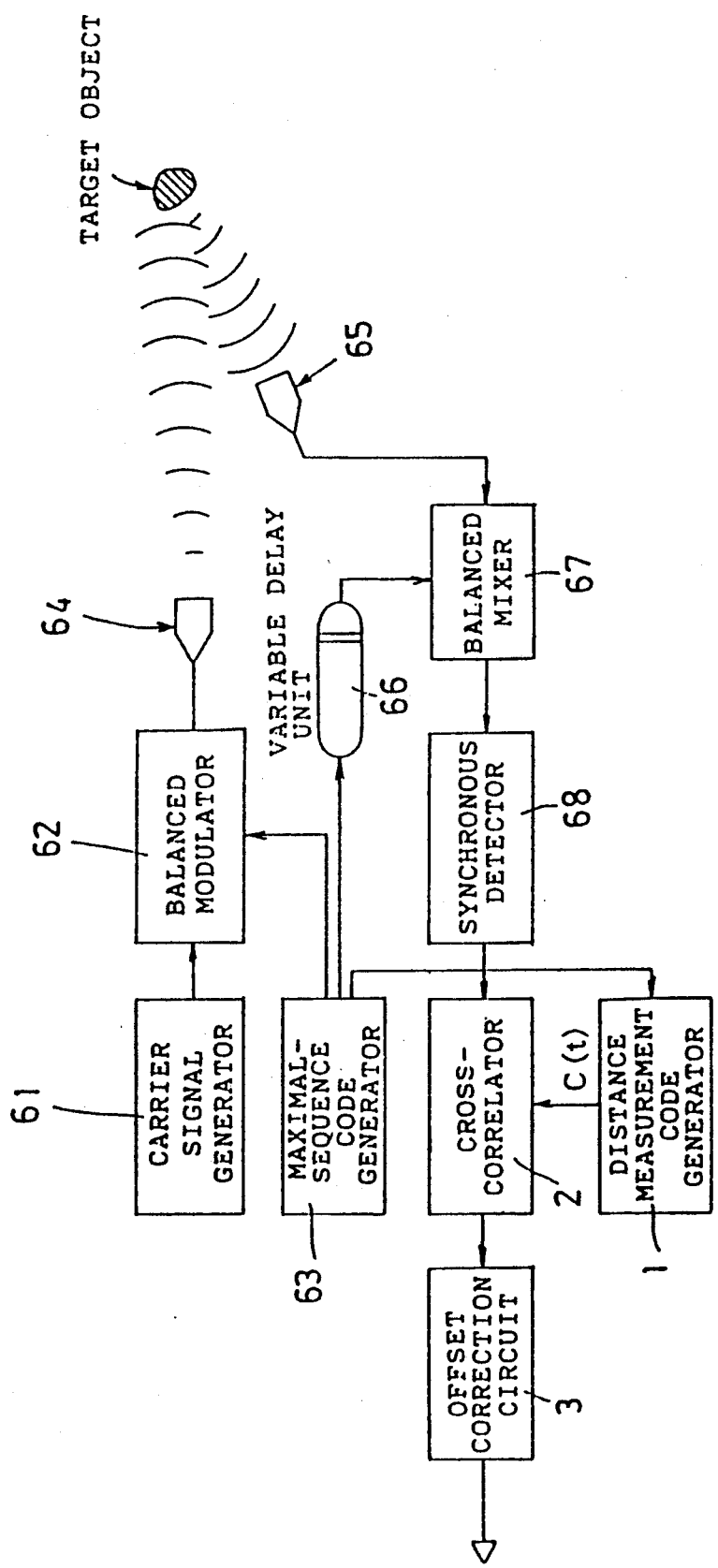
FIG. 1 is a block diagram of an embodiment of the distance measurement apparatus in accordance with the present invention.

FIG. 1 is a block diagram of an embodiment of the distance measurement apparatus in accordance with the present invention.

In a transmission side, a carrier signal output from a carrier generator 61 is supplied to a balanced modulator 62 and a standard maximal-sequence code output from a maximal-sequence code generator 63 is also supplied to the balanced modulator 63 so as to modulate the carrier signal with the standard maximal-sequence code to obtain a modulated signal. Then, the modulated signal is radiated to a target object by a transducer 64. In a receiving side, the modulated signal reflected by the target object is received by a receiver 65. The modulated signal thus received is supplied to a balanced mixer 67 to which a maximal-sequence code is supplied through a variable delay unit 66, to obtain an inpulse response corresponding to the target object. The inpulse response is supplied to a cross-correlator 2 through a synchronous detector 68 to obtain a cross-correlation value corresponding to the distance to the target object. The receiving side includes a distance measurement code generator 1 for generating a sequence code (hereinafter referred to as distance measurement code) C(t) according to the equaltion $$C(t) = \sum_{j=0}^{2^n-2} Wj \cdot m(t + j\Delta T)$$

which is not simply a maximal-sequence code but a distance measurement code obtained by convoluting expected values for measurement Wj (where j=0, 1, .. . $2^1-2$) with maximal-sequence codes which are sequentially phase shifted, the standard maximal-sequence code m(t) having a bit length of $2^n-1$ bits with every 1 bit. The distance measurement code C(t) is supplied to the cross-correlator 2 so as to obtain a cross-correlation value for a maximal-sequence code $m(t+ \times \Delta T)$ having an unknown phase shifting quantity with the distance measurement code C(t). The receiving side also includes an offset correction circuit 3 for applying offset correction to the obtained cross-correlation value. In this embodiment, the expected value for measurement W0 is determined to be 0 so as to define a "0" level.

Figure 2:
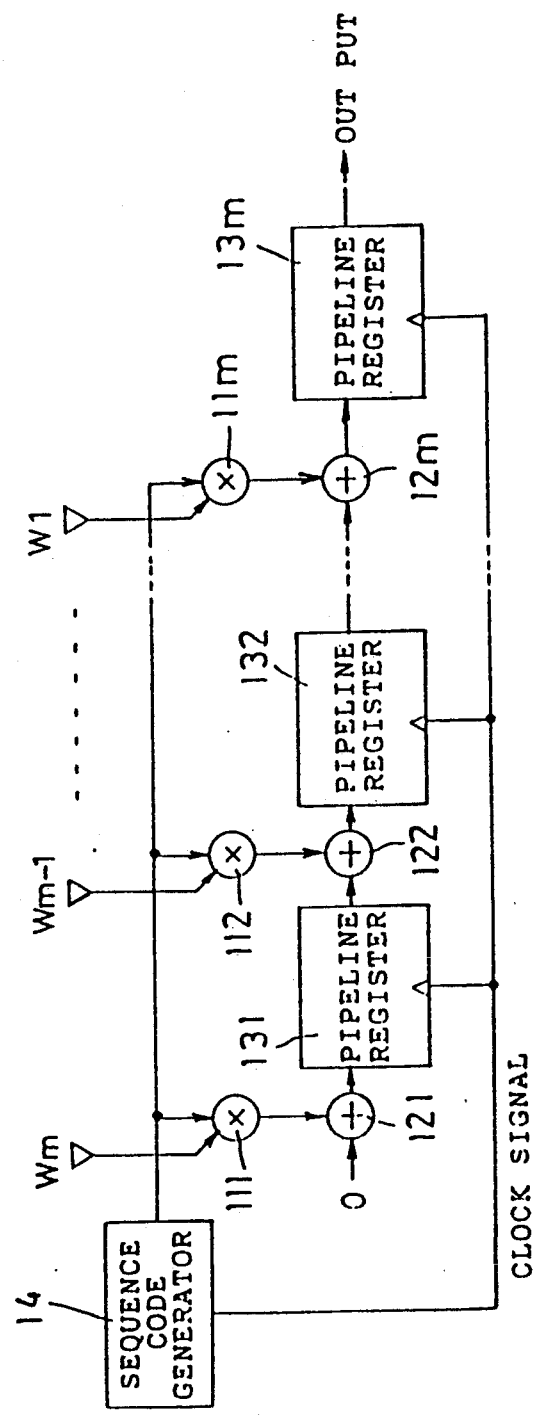
FIG. 2 is a block diagram showing an arrangement of a sample of a distance measurement code generator.

FIG. 2 is a block diagram showing an arrangement of a sample of a distance measurement code generator.

An m-number of expected values for measurement Wm ... W2, W1 are supplied to pipeline registers 13m ... 132, 131 through multipliers 11m ... 112, 111 and adders 12m ... 122, 121, respectively. The standard maximal-sequence code output from a sequence code generator 14 is supplied to the multipliers 11m ... 112, 111. Contents of each pipeline register are supplied to the next adder so as to convolute the maximal-sequence codes phase shifted with individual phase shifting quantity. The adder 121 of the first stage is supplied a value of "0" corresponding to the expected value for measurement W0, while output from the register 13m of the laste stage is supplied to a data bus.

In this embodiment, all expected values for measurements Wm ... W2, W1 are modulated based upon the standard maximal-sequence code. Each modulated expected value is supplied to a next successive adder through the pipeline registers 131, 132 ... 13m respectively, then each successive modulated expected value is added and shifted by 1 bit of the maximal sequence code so as to obtain a distance measurement code C(t).

The disadvantage of remarkably complicating its arrangement does not arise even when the maximal-sequence code is lengthened in bit length because only the numbers of multipliers, adders and pipeline registers are increased in lengthening of bit length. On the contrary, when the number of expected values for measurement Wj is not increased, the number of circuits present in the distance measurement apparatus is not necessarily changed.

In the distance measurement apparatus having the arrangement mentioned above, when a maximal-sequence code $m(t+x\Delta T)$ having unknown phase shifting quantity is recieved, a cross-correlation value of the received maximal-sequence code with a j-bits, phase shifted maximal-sequence code (where j satisfies an inequality of $x-1 <j<x+1$) is obtained as the maximum cross-correlation value and is output from the cross-correlator 2. The cross-correlation value is corrected by the offset correction circuit 3 and conversion processing is applied of necessary to obtain the distance because the cross-correlation value as it is does not have a value corresponding to the distance.

As is apparent from the foregoing, the expected values for measurement Wj can be determined voluntarily.

Second Embodiment

Figure 3A:
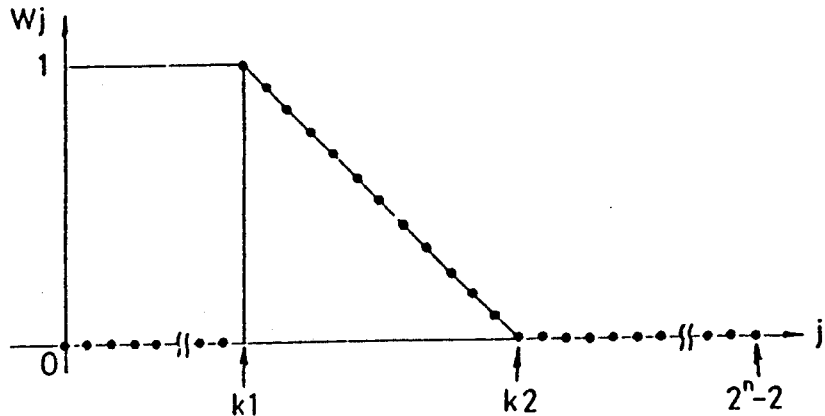
FIGS. 3(A), 3(B), and 3(C) are diagrams useful in explaining determination of a range permitting measurement.
Figure 3B:
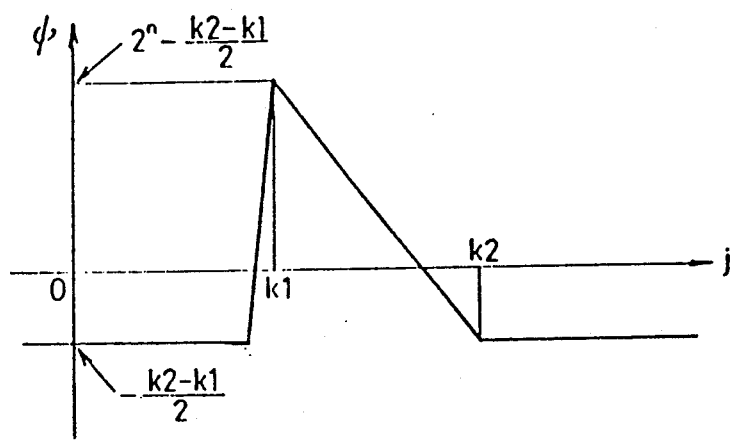
Figure 3C:
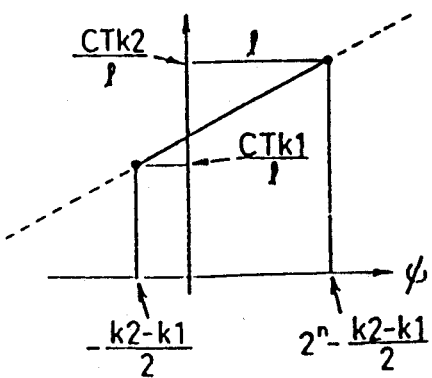

FIGS. 3(A), 3(B), and 3(C) are diagrams for explaining determination of a range permitting measurement. FIG. 3-(A) shows expected values for measurement Wj, while FIG. 3-(B) illustrates a cross-correlation function for a distance measurement code with a maximal-sequence code.

The expected values for measurement Wj are determined within the range of $0 \leq j \leq 2^n-2$ as shown in FIG. 3-(A). Concretely, the expected value for measurement Wk1 is determined as 1 when j=k1, the expected value for measurement Wk2 is determined as 0 when j=k2, the expected values for measurements Wj within the range of k1<j<k2 are determined as linearly varying values within the range of 1>Wj>0 and the expected values for measurement Wj without the range are determined as 0. The cross-correlation function $\phi$ of the distance measurement code with the maximal sequence code is represented by the equation $\phi=2^n-(k2-k1)/2$ when j=k1, and is represented by teh equation of $\phi=-(k2-k1)/2$ when j=k2, and is represented by the equation of $\phi=-(k2-k1)/2$ when $j \leq k1-1$ or $k2 \leq j$, and the value of the cross-correlation function $\phi$ linearly varies within the range of $k1 \leq j \leq k2$.

When the distance is measured using the distance measurement code C(t), the cross-correlation value greater than $-(k2-k1)/2$ is obtained only when the target object exists within the range of $k1 \leq j<k2$. Then, the distance to the target object can be measured by applying an offset correction. The offset correction is performed to determine the distance D as Dk2=CTk1/1 when the cross-correlation function $\phi$ is $-(k2-k1)/2$ and to determine the distance D as Dk1<CTk2/1 when the cross-correlation function $\phi$ is $2^n-(k2-k1)/2$ as shown in FIG. 3-C $$\left( \text{where } 1' = \sum_{j=0}^{2^n-2} Wj \right).$$

The distance to the target object can be measured by simply applying the offset correction to the obtained cross-correlation value when the expected values for measurement Wj are determined as above-mentioned values.

In this embodiment, the distance can be measured only within the range of $CTk1/1 \leq D \leq CTk2/1$. Thereby, influences by interfering objects outside the range and by multipath reflection can securely be eliminated so as to perform accurate distance measurement.

Third Embodiment

Figure 4:
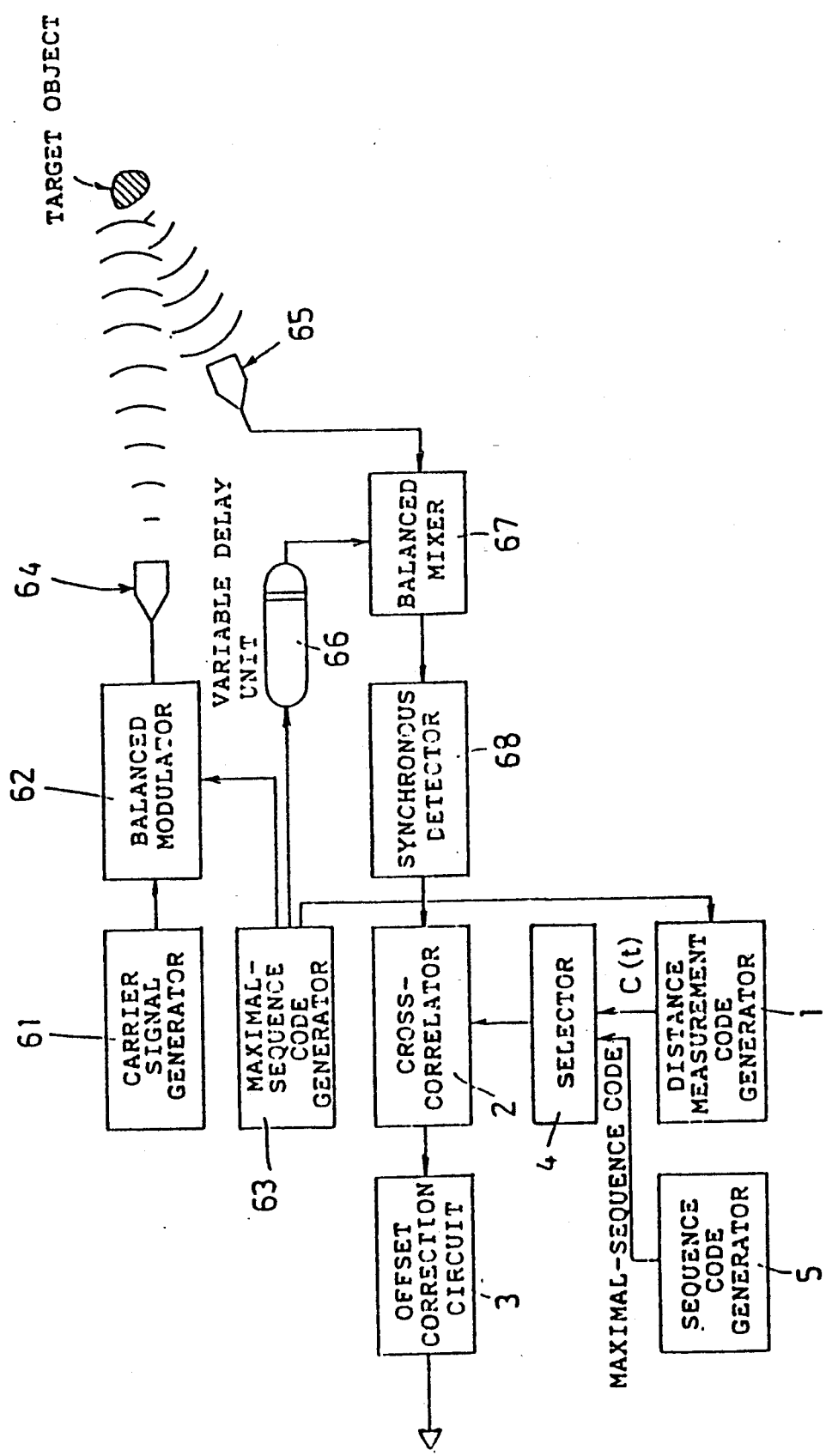
FIG. 4 is a block diagram of a main portion of a receiving section corresponding to another embodiment of the distance measurement apparatus in accordance with the present invention.

FIG. 4 is a block diagram of a main portion of a receiving section corresponding to another embodiment of the distance measurement apparatus in accordance with the present invention.

This embodiment differs from the first embodiment in that a selector 4 is interconnected between the distance measurement code generator 1 and the cross-correlator 2, and a maximal-sequence code having a desired bit shifting quantity output from a sequence code generator 5 and the distance measurement code are selectively supplied to the cross-correlator 2.

Figure 5:
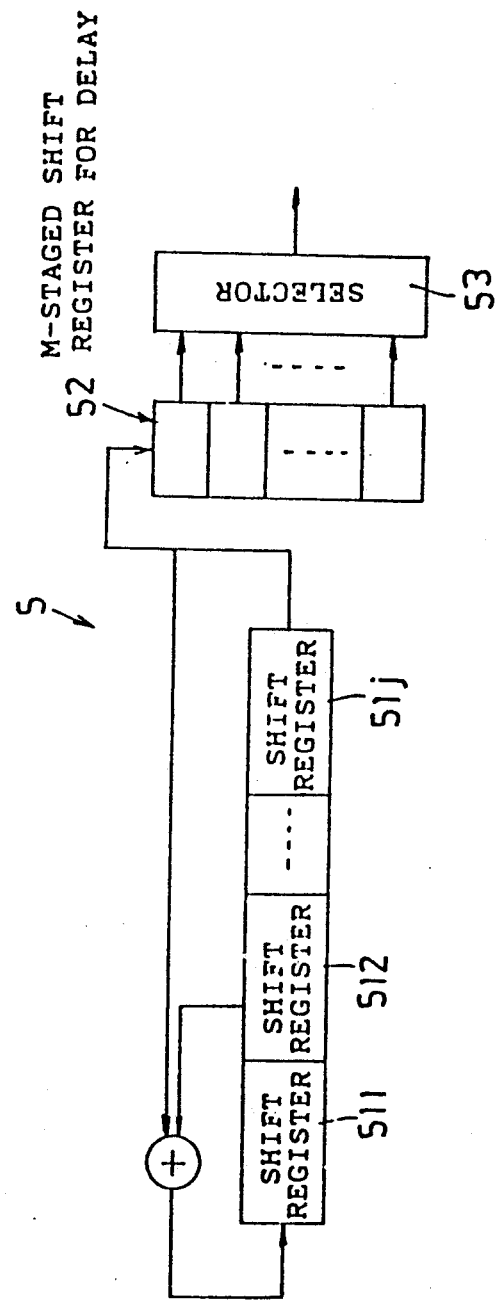
FIG. 5 is a block diagram showing an arrangement of a sequence code generator.

FIG. 5 is a block diagram showing an arrangement of the sequence code generator.

A number, J, of shift registers 511, 512 . . . 51j are serially connected and an exclusively logical and operation result based upon the output data from the shift register of the output stage and the output data from the shift register of a predetermined stage is supplied to the shift register of the input stage. The output data from the shift register 51j of the output stage is supplied to an m-staged shift register 52 for delay. The content of a desired stage of the shift register 52 is selected by a selector 53 to be output therefrom. The number j of stages of the shift registers is determined as $2^j - 1 \geq m$, and the perdetermined stage is determined to repeat the same bit pattern with a cycle of $2^j - 1$ times. Further, a conversion circuit (not shown) is provided for converting the "0" level of the binary data output from the selector 53 to the "1" level. The number of shift registers 511, 512 . . . 51j is 7, then the bit length of the maximal-sequence code is 127 bits.

This embodiment first performs distance measurement based upon the distance measurement code C(t) similarly to the embodiment mentioned above, then calculates the cross-correlation value by controlling the selector 53 to output the maximal-sequence code having the corresponding bit shifting quantity based upon the measured distance, thereby the accuracy for distance measurement is improved.

The distance measurement method and apparatus according to the present invention are not limited to the embodiments mentioned above. The distance measurement method and apparatus may perform distance measurement using pseudo noise having significant auto-correlation characteristics other than the maximal-sequence code, for example random numbers, a balowa-sequence code and the like. The distance measurement method and apparatus may employ pseudo noise having an arbitrary bit length.

Fourth Embodiment

Figure 8:
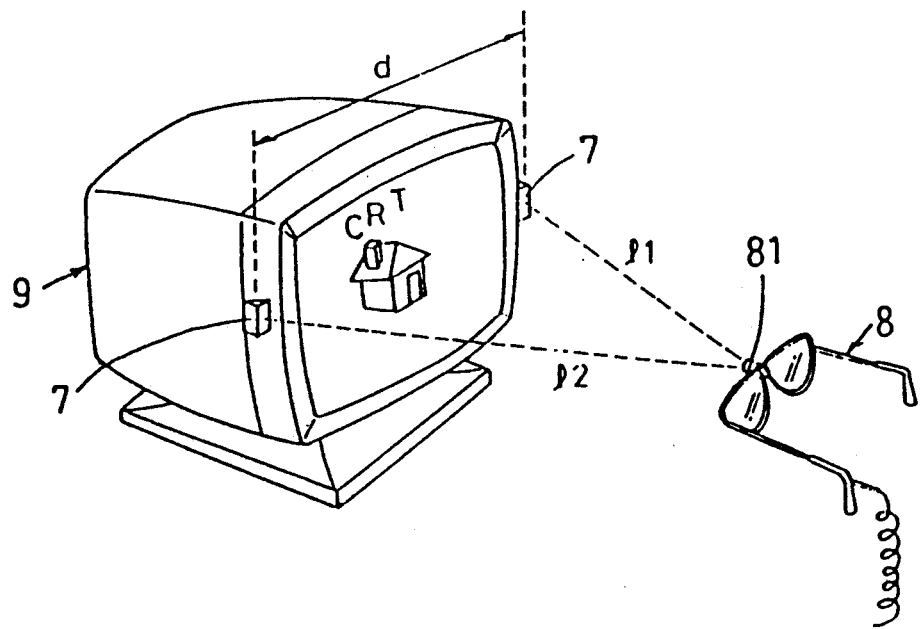
FIG. 8 is a schematic perspective view of a graphics display apparatus to which the relative position measurement apparatus is provided.

FIG. 8 is a schematic perspective view of a graphics display apparatus to which a relative position measurement apparatus is provided.

A pseudo noise transmitter 81 is provided at the position of the illustrated spectacles for stereoscopic vision, or filtering, or the like (hereinafter referred to as spectacles). Pseudo noise receivers 7 are provided at a predetermined edge position of a graphics display apparatus 9. The pseudo noise transmitter 81 may radiate ultrasonic waves to which are applied two phase modulation based upon a maximal-sequence code as a pseudo noise, for example. The distance between the pseudo noise receivers 7 is determined as d. The distances between the pseudo noise transmitter 81 and each pseudo noise receiver 7 are represented as 11 and 12 respectively.

Figure 6:
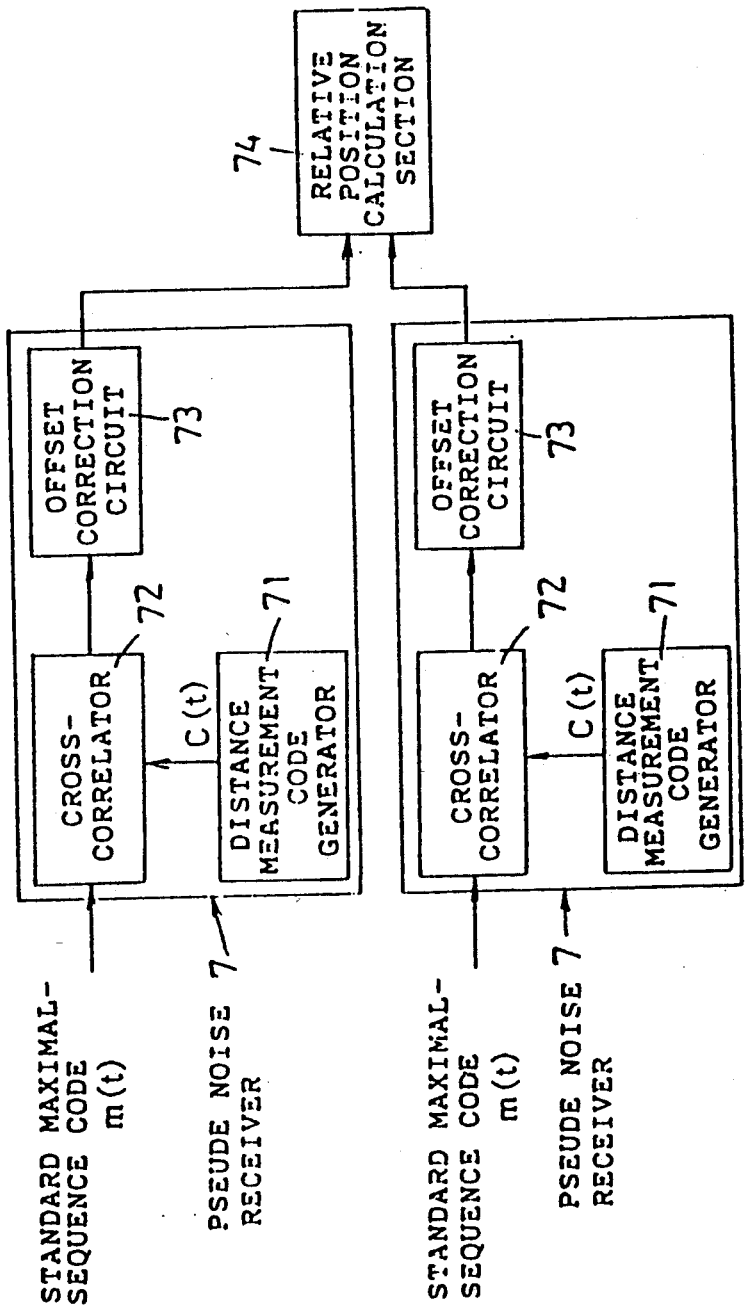
FIG. 6 is a block diagram of a main portion of a pseudo noise receiver corresponding to an embodiment of the relative position measurement apparatus in accordance with the present invention.

FIG. 6 is a block diagram of a main portion of the pseudo noise receiver corresponding to an embodiment of the relative position measurement apparatus in accordance with the present invention.

Each pseudo noise receiver includes a distance measurement code generator 71 for generating a distance measurement code C(t) repersented by the equation of $$C(t) = \sum_{j=0}^{2^n-2} Wj \cdot m(t + j\Delta T)$$

which is obtained by convoluting expected values for measurement Wj (where j=0, 1, . . . $2^n-2$) having individual values with maximal-sequence codes which are sequentially phase shifted, the standard maximal-sequence code m(t) having a bit length of $2^n - 1$ bits with every 1 bit. The receiver also has a cross-correlator 72 for obtaining a cross-correlation value of a maximal-sequence code $m(t+x\Delta T)$ having an unknown phase shifting quantity with the distance measurement code C(t), and an offset correction circuit 73 for applying offset correction to the obtained cross-correlation value. Further, a relative position calculation section 74 is provided which section 74 receives the distance measurement signals output from the offset correction circuits 73 of each all pseudo noise receiver 7 and calculates a relative position based upon the distance measurement signals. In this embodiment, the expected value for measurement WO is determined as 0 so as to define a "0" level.

Figure 7:
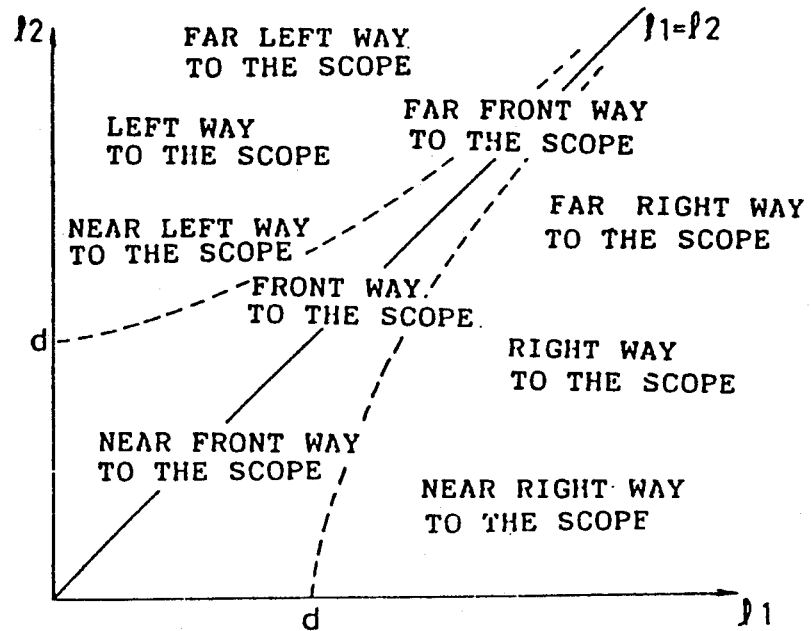
FIG. 7 is a diagram illustrating a relative position of an operator with respect to an apparatus and a predetermined threshold value.

In the relative position measurement apparatus having the arrangement mentioned above, when a maximal-sequence code $m(t + x \Delta T)$ having unknown phase shifting quantity is received, a cross-correlation value of the received maximal-sequence code with a j-bits phase shifted maximal-sequence code (where j satisfies an inquality of $x - 1 < j < + 1$) is obtained as the maximum cross-correlation value and is output from the cross-correlation correlator 72. The cross-correlation value is corrected by the offset correction circuit 73 and undergoes conversion processing in correspondence with the necessity to obtain the distance because the cross-correlation value as it is does not have a value corresponding to the distance. Values output for the offset correction circuits 73 are supplied to the relative position calculation section 74. The relative position calculation section 74 calculates the relative position of an operator with respect to the graphics display device 9 because the relative positions of the pseudo noise transmitter 81 provided with the spectacles 8, with respect to the graphics display apparatus 9 as shown in FIG. 7 and predetermined constants, for example the distance between the pseudo noise receivers 7 previously determined.

This embodiment securely eliminates malfunction caused by noise output from office automation apparatus, also securely eliminates malfunctions of sound input interfaces and interference between interfaces employed in the same system, thereby accuracy of the relative position measurement is improved.

Further, the graphics display apparatus 9 calculates an operator viewing direction based upon the calculated relative position, then change a perspective projection of display figures in correspondence with the calculated viewing direction, thereby superior stereoscopic disply is performed.

As is apparent from the foregoing, the expected values for measurement Wj can be determined volubtarily.

Further, an actual range permitting measurement can be determined by setting the expected values for measurement Wj having other than 0 within a desired range which is included by a maximum range permitting measurement. In this case, measurement accuracy of the relative position is improved by limiting the actual range permitting distance measurement which is the base of calculation of relative position, to the neighbouring graphics display apparatus 9.

FIFTH EMBODIMENT

Figure 9:
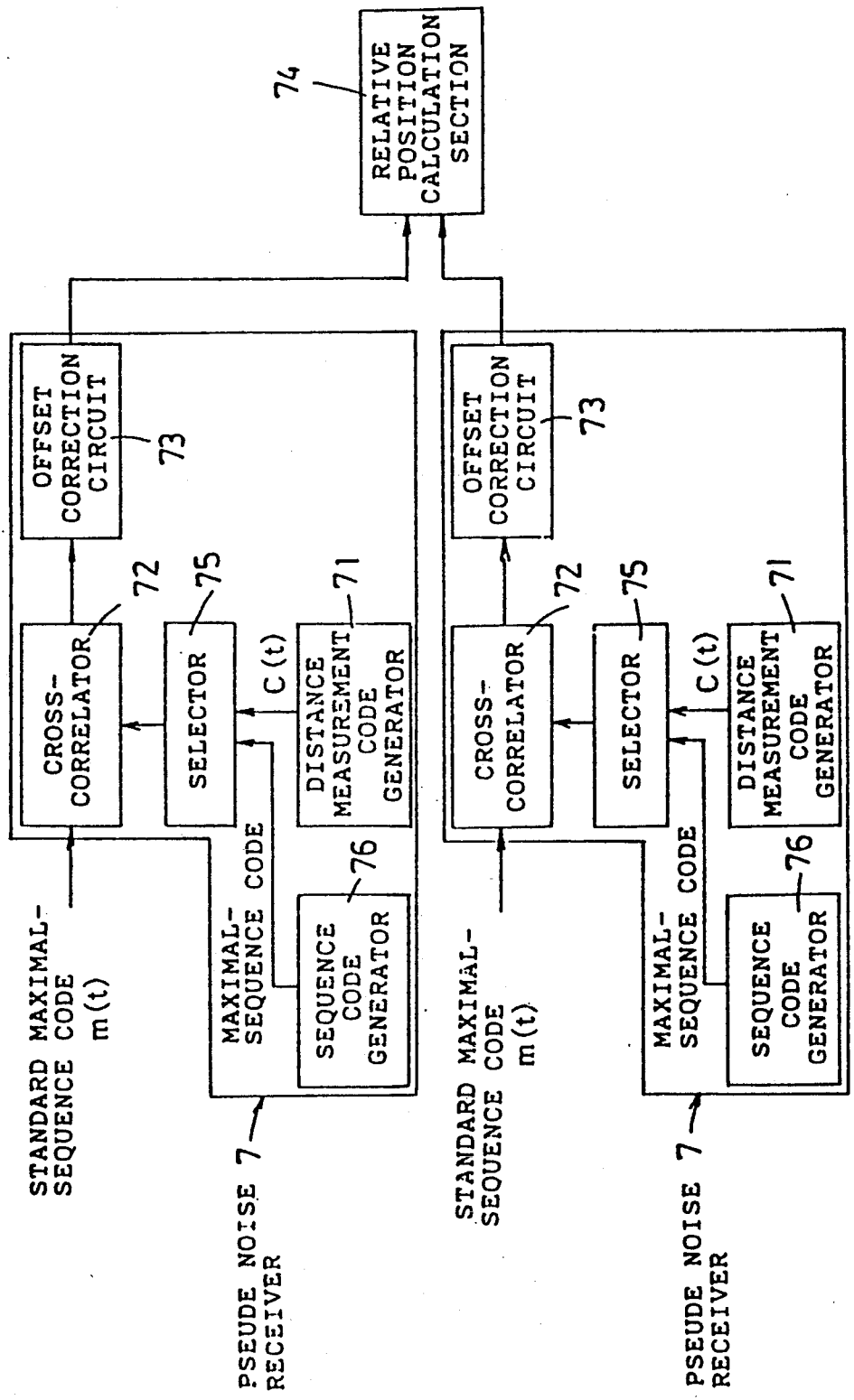
FIG. 9 is a block diagram of a main portion of a receiving section corresponding to another embodiment of the relative position measurement apparatus in accordance with the present invention.
Figure 10:
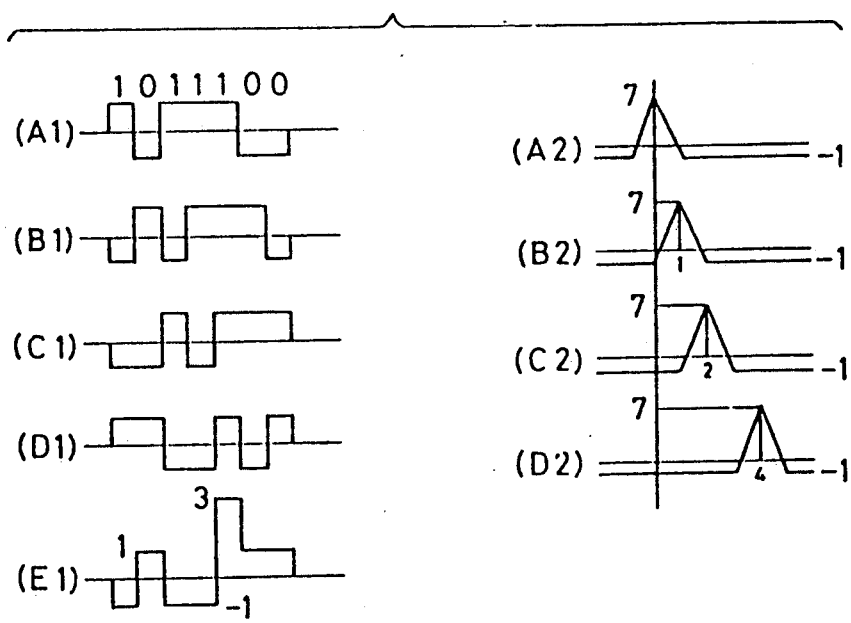
FIG. 10 is a diagram useful for explaining newly found characteristics of a maximal-sequence code.
Figure 11:
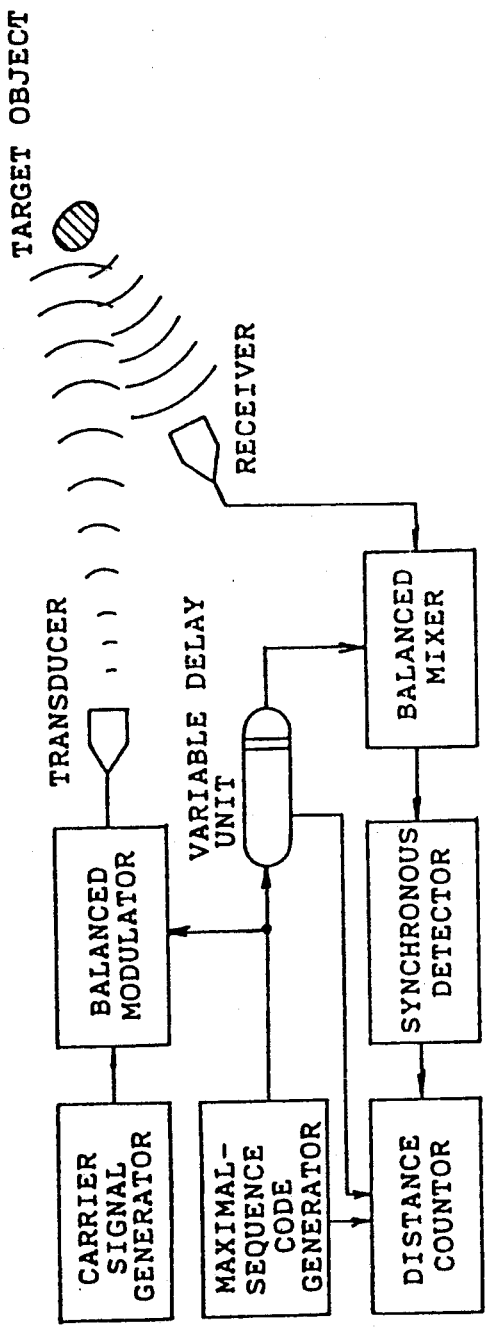
FIG. 11 is a block diagram of a conventional distance measurement apparatus using a maximal-sequence code.
Figure 12:
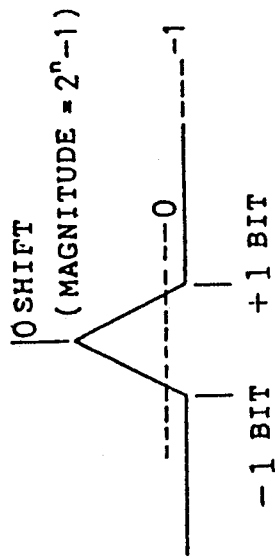
FIG. 12 is a diagram useful for explain widely known characteristics of a maximal-sequence code.

FIG. 9 is a block diagram of a main portion of a receiving section corresponding to another embodiment of the relative position measurement apparatus in accordance with the present invention.

This embodiment differs from the fourth embodiment in that a selector 75 is interconnected between the distance measurement code generator 71 and the cross-correlator 72, and a maximal-sequence code having a desired bit shifting quantity output from a sequence code generator 76 and the distance measurement code are selectively supplied to the cross-correlator 72.

This embodiment first performs distance measurement based upon the distance measurement code C(t), similar to the embodiment mentioned above, then calculates the cross-correlation value by controlling the selector 75 to output the maximal-sequence code having the corresponding bit shifting quantity based upon the measured distance. Thereby, the accuracy for distance measurement is improved and the accuracy for relative position measurement is also improved.

The relative position measurement apparatus according to the present invention are not limited to the embodiments mentioned above. The relative position measurement apparatus may perform relative position measurement using pseudo noise having significant auto-correlation characteristics other than the maximal-sequence code, for example random numbers, a balowa-sequence code and the like. The relative position measurement apparatus may employ pseudo noise having an arbitrary bit length. The relative position measurement apparatus may be applied to an industrial robot and the like so as to prevent accidents resulting in injury or depth from occurring.

The terms and expressions which have been employed are used as terms of description and not as limitations, and there is no intention, in the use of such terms and expression of excluding equivalents of the features shown and described, or portions thereof, it being recognized that various modifications are possible within the scope of the invention as claimed.

What is claimed is:

1. A distance measurement method comprising the steps of:
    radiating pseudo noise which has significant auto-correlation characteristics to a target object;
    receiving pseudo noise reflected from the target object;
    cross-correlating received reflected pseudo noise with convolution noise which is obtained by convoluting pseudo noises which are multiplied by different corresponding coefficients to obtain a cross-correlation value; and
    measuring the distance based upon said obtained cross-correlation value.

2. A distance measurement method as set forth in claim 1, wherein said pseudo noise is a maximal-sequence code and said convolution noise is obtained by convoluting expected values as coefficients with the pseudo noise.

3. A distance measurement method as set forth in claim 1, wherein said expected values have monotonously varying values other than 0 within a permitted measurement range and have 0 value outside the permitted range.

4. A distance measurement apparatus comprising;
    transmission means for modulating a carrier signal with pseudo noise to obtain a modulated signal and for radiating said modulated signal to a target object; and
    receiving means for receiving a signal reflected from the target object and for obtaining a distance to the target object,
    said receiving means includes convolution code output means for outputting a convolution code which is obtained by convoluting expected values which are different from one another with every shifted pseudo noise bit, said transmission means having a sequence code which is the same as a sequence code used for convolution by said convolution code output means, cross-correlation means for cross-correlating the received pseudo noise with said convolution code to obtain a cross-correlation value, and distance calculation means for calculating the distance based upon said cross-correlation value.

5. A distance measurement apparatus as set forth in claim 4, wherein said pseudo noise is a maximal-sequence code and said convolution code is obtained by convoluting expected values as coefficients with said pseudo noise.

6. A distance measurement apparatus as set forth in claim 4, wherein said expected values have monotonously varying values other than 0 within a permitted measurement range and have 0 value outside the permitted range.

7. A relative position measurement apparatus comprising;
    a pseudo noise radiation source means for radiating pseudo noise worn to an operator of an apparatus;
    plural pseudo noise receiving means for obtaining distances to the operator, the receiving means being attached to the apparatus of predetermined positions which are apart from one another; and
    relative position obtaining means for obtaining a relative position of the operator based on the distances obtained by said pseudo noise receiving means,
    wherein said pseudo noise receiving means includes convolution code output means for outputting a convolution code which is obtained by convoluting expected values which are different from one another with every bit of shifted pseudo noise, said radiated pseudo noise being a sequence code for convolution by said convolution code output means, cross-correlation means for cross-correlating the received pseudo noise with said convolution code to obtained 0 cross-correlation value, and distance calculation means for calculating the distance based upon said cross-correlation value.

8. A relative position measurement apparatus as set forth in claim 7, wherein said pseudo noise radiation source means is a maximal-sequence sound source, said apparatus is a three-dimensional graphics display apparatus, and said three-dimensional graphics display apparatus determines a viewing direction based upon the calculated relative position.

9. A relative position measurement apparatus as set forth in claim 7, wherein said convolution code output means outputts a convolution code which is obtained by convoluting expeected values having monotonously varying values other than 0 within a permitted measurement range and having 0 value outside the permitted range.

* * * * *